(12) United States Patent
Øverbye

(10) Patent No.: US 10,275,885 B2
(45) Date of Patent: Apr. 30, 2019

(54) PERIMETER DETECTION

(71) Applicant: String Limited, Surrey (GB)

(72) Inventor: Johan Øverbye, Kongsberg (NO)

(73) Assignee: String Limited, Surrey (GB)

( * ) Notice: Subject to any disclaimer, the term of this patent is extended or adjusted under 35 U.S.C. 154(b) by 8 days.

(21) Appl. No.: 15/310,059

(22) PCT Filed: May 13, 2015

(86) PCT No.: PCT/GB2015/051404
§ 371 (c)(1),
(2) Date: Nov. 9, 2016

(87) PCT Pub. No.: WO2015/173564
PCT Pub. Date: Nov. 19, 2015

(65) Prior Publication Data
US 2017/0262997 A1  Sep. 14, 2017

(30) Foreign Application Priority Data
May 13, 2014 (GB) .................................. 1408496.6

(51) Int. Cl.
*G06T 7/11* (2017.01)
*G06T 7/13* (2017.01)
(Continued)

(52) U.S. Cl.
CPC .................. *G06T 7/11* (2017.01); *G06T 7/12* (2017.01); *G06T 7/13* (2017.01); *G06T 7/181* (2017.01);
(Continued)

(58) Field of Classification Search
CPC .. G06T 7/12; G06T 7/13; G06T 7/181; G06T 2207/20112; G06T 7/11; G06T 7/194;
(Continued)

(56) References Cited

U.S. PATENT DOCUMENTS 5,475,507 A * 12/1995 Suzuki ...................... G06T 7/12
358/500
6,665,439 B1 * 12/2003 Takahashi ............ G06K 9/0063
382/165

(Continued)

FOREIGN PATENT DOCUMENTS

CN         103440644 A    12/2013
EP           2492869 A2     8/2012
(Continued)

OTHER PUBLICATIONS

Dam E B et al: "Efficient Segmentation by Sparse Pixel Classification", IEEE Transcations on Medical Imaging, IEEE Service Center, Piscataway, NJ, US, vol. 27, No. 10, Oct. 1, 2008 (Oct. 1, 2008), pp. 1525-1534.
(Continued)

*Primary Examiner* — Kim Y Vu
*Assistant Examiner* — Michael J Vanchy, Jr.
(74) *Attorney, Agent, or Firm* — Mintz Levin Cohn Ferris Glovsky and Popeo, P.C.

(57) ABSTRACT

A method for identifying a color block area in an image, the method comprising: a) scanning for border crossings in the image in a direction from a user-provided origin point; b) on finding a border crossing, tracing a path of the border such that the color block area is on a predetermined side of the traced path; and c) if the path encloses the origin point and is traced clockwise or counterclockwise according to the predetermined choice of keeping the color block area to the right or left respectively, determining that the border is the perimeter for the color block area; or if not, continuing to scan for border crossings in said direction.

20 Claims, 5 Drawing Sheets

(51) Int. Cl.
*G06T 7/90* (2017.01)
*G06T 7/12* (2017.01)
*G06T 7/181* (2017.01)

(52) U.S. Cl.
CPC ...... *G06T 7/90* (2017.01); *G06T 2207/10016* (2013.01); *G06T 2207/20101* (2013.01)

(58) Field of Classification Search
CPC ............. G06T 2207/20101; G06T 7/90; G06F 17/3025; G06F 17/30256; G06F 17/30259
See application file for complete search history.

(56) References Cited

U.S. PATENT DOCUMENTS

| | | |
|---|---|---|
| 2004/0179737 A1 | 9/2004 | Skourikhine et al. |
| 2013/0336529 A1* | 12/2013 | Itani .................. G06F 3/017 382/103 |
| 2014/0072208 A1 | 3/2014 | Kenyon et al. |

FOREIGN PATENT DOCUMENTS

| | | |
|---|---|---|
| EP | 2615597 A1 | 7/2013 |
| JP | S61214082 A | 9/1986 |
| JP | S6324482 A | 2/1988 |
| WO | WO-2006/006666 A1 | 1/2006 |
| WO | WO-2013/186662 A1 | 12/2013 |

OTHER PUBLICATIONS

Aishy Amer: "Memory-based spatio-temporal real-time object segmentation for video surveillance", Proceedings of SPIE, vol. 5012, Apr. 14, 2003 (Apr. 14, 2003), pp. 10-21.

Change F et al: "A Linear-time component-labeling algorithm using contour tracing technique", Computer Vision and Image Understanding, Academic Press, US, vol. 93, No. 2, Feb. 1, 2004 (Feb. 1, 2004), pp. 206-220.

International search report issued in PCT/GB2015/051404 dated Aug. 17, 2015.

Search report issued in GB1408496.6 dated Nov. 10, 2015.

* cited by examiner

PERIMETER DETECTION

CROSS-REFERENCES TO RELATED APPLICATIONS

This application is a national stage entry, filed under 35 U.S.C. § 371, of International Application No. PCT/GB2015/051404, filed on May 13, 2015, and claims the benefit of and priority to Great Britain Patent Application No. 1408496.6, filed on May 13, 2014, the entire contents of which are hereby incorporated herein by reference in their entireties and for all purposes.

This invention relates to identifying colour block areas in images.

It is commonplace for computing devices to gather, process and display images. For example, many mobile phones, tablet computers and personal computers can collect images from an on-board camera, process those images and display the processed images on a screen. The processing could involve a very simple algorithm such as converting a still image from colour to greyscale. More complex algorithms might include noise reduction and tonal enhancement, and might be applied to video rather than to still photos.

An important field of image analysis is border or boundary detection. Border detection involves estimating the location of borders between regions of an image. Those regions might correspond to objects as perceived by a viewer to be represented in the image. Once the locations of the borders have been estimated additional processing could be carried out on the image. In one example, the additional processing could involve re-colouring an object or an area of an image surrounded by a border in order to create a visual effect. In another example, the additional processing could involve inferring a three-dimensional relationship between objects whose perimeters have been estimated, either from a single image or from a series of images of a similar scene taken at different locations.

Although border detection can provide many advantages, it is a complex problem, and is particularly difficult to implement on a device that has relatively little computing power. An example of this is when border detection is to be performed on a mobile phone. The computing power of mobile phones is increasing, but it is still very limited; and since mobile phones are battery powered it is desirable to minimise the amount of energy they expend in performing video processing, to thereby improve battery life.

Examples of border detection algorithms are disclosed in EP 2 615 597 A, US 2014/072208, WO 2013/186662 and CN 103440644 A.

In some applications it is desirable to be able to process video data in real time. Where the video is made up of a series of frames, real time processing involves processing a frame of the video in less time—at least on average—than the period between successive frames. In one example application, a device has a camera and a display screen that can display the video stream being captured by the camera. It might be desired to manipulate the displayed video stream, for example to overlay on the captured video pre-prepared graphical representations which move on the display as the camera zooms and pans to give the illusion that they are present in real life.

It would be desirable to have an algorithm that minimises the amount of computing power required to detect areas and features in images. It would be desirable for such an algorithm to be implemented on a portable device such as a mobile phone to analyse frames in real-time video of reasonable resolution.

According to a first aspect of the present invention there is provided a method for identifying a colour block area in an image, the method comprising: a) scanning for border crossings in the image in a direction from a user-provided origin point; b) on finding a border crossing, tracing a path of the border such that the colour block area is on a predetermined side of the traced path; and c) if the path encloses the origin point and is traced clockwise or counterclockwise according to the predetermined choice of keeping the colour block area to the right or left respectively, determining that the border is the perimeter for the colour block area; or if not, continuing to scan for border crossings in said direction.

If the border is determined to be the perimeter of the colour block area, the image may be scanned in a series of directions inwards from the perimeter so as to detect further border crossings in the image.

Suitably, on detecting each further border crossing in the image: tracing a further border defined by that further crossing; determining that the traced further border is within the perimeter for the colour block area and encloses a further area; and scanning the image in a series of directions outwards from said further border so as to detect a other border crossings in the image.

Suitably, on detecting the perimeter of a colour block area containing the origin point: determining whether said perimeter exceeds a predetermined threshold and/or the size of the area exceeds a predetermined threshold and/or the circumference of said perimeter that encloses the area exceeds a predetermined threshold; if not, discarding the detected perimeter and continuing to scan in the same direction.

The series of directions may comprise a first set of mutually parallel directions and a second set of mutually parallel directions orthogonal to the first set of mutually parallel directions.

In each step of scanning the image in a series of directions the available directions may be the same.

The method may further comprise determining a region of the image (i) having as its perimeter the perimeter of the colour block area and (ii) excluding the or each further area defined by the or each further border.

The method may further comprise processing the image to apply a transformation to the determined region, the remainder of the image remaining substantially unchanged under the transformation; and displaying an image resulting from the transformation.

The transformation may be a change of chrominance and/or luminance.

The method may further comprise: displaying the image via a device; and obtaining user input via said device indicating the origin point.

The image may be a frame of a video stream.

According to a second aspect of the present invention there is provided a device comprising: a memory storing non-transient program code; and a processor configured to identify a colour block area, given an image and a user-provided origin point by executing the code to perform the steps of: a) scanning for border crossings in the image in a direction from a user-provided origin point; b) on finding a border crossing, tracing a path of the border such that the colour block area is on a predetermined side of the traced path; and c) if the path encloses the origin point and is traced clockwise or counterclockwise according to the predetermined choice of keeping the colour block area to the right or left respectively, determining that the border is the perimeter for the colour block area; or if not, continuing to scan for border crossings in said direction.

The processor may be further configured to perform the step of: if the border is determined to be the perimeter of the colour block area, scanning the image in a series of directions inwards from the perimeter so as to detect further borders crossings in the image.

The device may comprise a camera and the image may be an image captured by the camera.

The device may comprise a display and the device may be configured to: determine a region of the image (i) having as its perimeter the perimeter of the colour block region and (ii) excluding the or each region defined by the or each further border that is within the perimeter of the colour block region; process the image to apply a transformation to the determined region, the remainder of the image remaining substantially unchanged under the transformation; and display the image resulting from the transformation on the display.

The image may be a frame of a video stream captured by the camera.

The device may be configured to perform the said steps in real time on successive frames of the video stream.

The colour block area may be a contiguous area of the image having substantially the same colour (e.g. chrominance) throughout.

The present invention will now be described by way of example with reference to the accompanying drawings. In the drawings.

The algorithms described below are for scanning an image to identify the perimeter of a colour block area of the image. In one example the algorithm involves, in essence, selecting an initial location, detecting a border (which may or may not be the perimeter of the solid colour area) and tracing that border. When tracing the border, the colour block area is kept to one side (left or right side). If the colour block area is kept to the right or left side while tracing and the border is traced in the clockwise or counter-clockwise direction respectively, then it is determined that the traced border is the perimeter of the colour block area.

Subsequently, scanning for borders can resume inwards from that perimeter in orthogonal directions to find parts of the image that are within the perimeter but not part of the block, and also scanning outwards from the perimeters of those parts in orthogonal directions to find other such parts. Conveniently the same pair of orthogonal directions can be used for scanning from all the perimeters.

An objective of the present algorithm is to detect the outer and inner borders of a colour block area in the image. The area is a contiguous region of the image that has some common overall characteristic. For example, it may be a region of a substantially uniform chrominance, tone or patterning which differs from the surrounding areas of the image. Alternatively, it may be bounded by a region that has a common overall chrominance, tone or patterning. The perimeter of the colour block area is an endless path around the interface between the area and one or more adjacent regions of the image that are distinct from the area. If the colour block area runs to the edge of the image then the perimeter may run along part or all of the edge of the image. The colour block area may have one or more inner borders. Each inner border is an endless path around the interface between the colour block area and a respective contiguous region of the image that is within the perimeter of the colour block area and is distinct from the colour block area.

Commonly, identifying areas in images (whether still images or a frame in recorded video or real-time video) involves carrying out a border detection algorithm on the whole image. The method described below provides an efficient way of identifying colour block areas, potentially reducing the amount of processing required to map the image in order to detect those areas.

Figure 1:
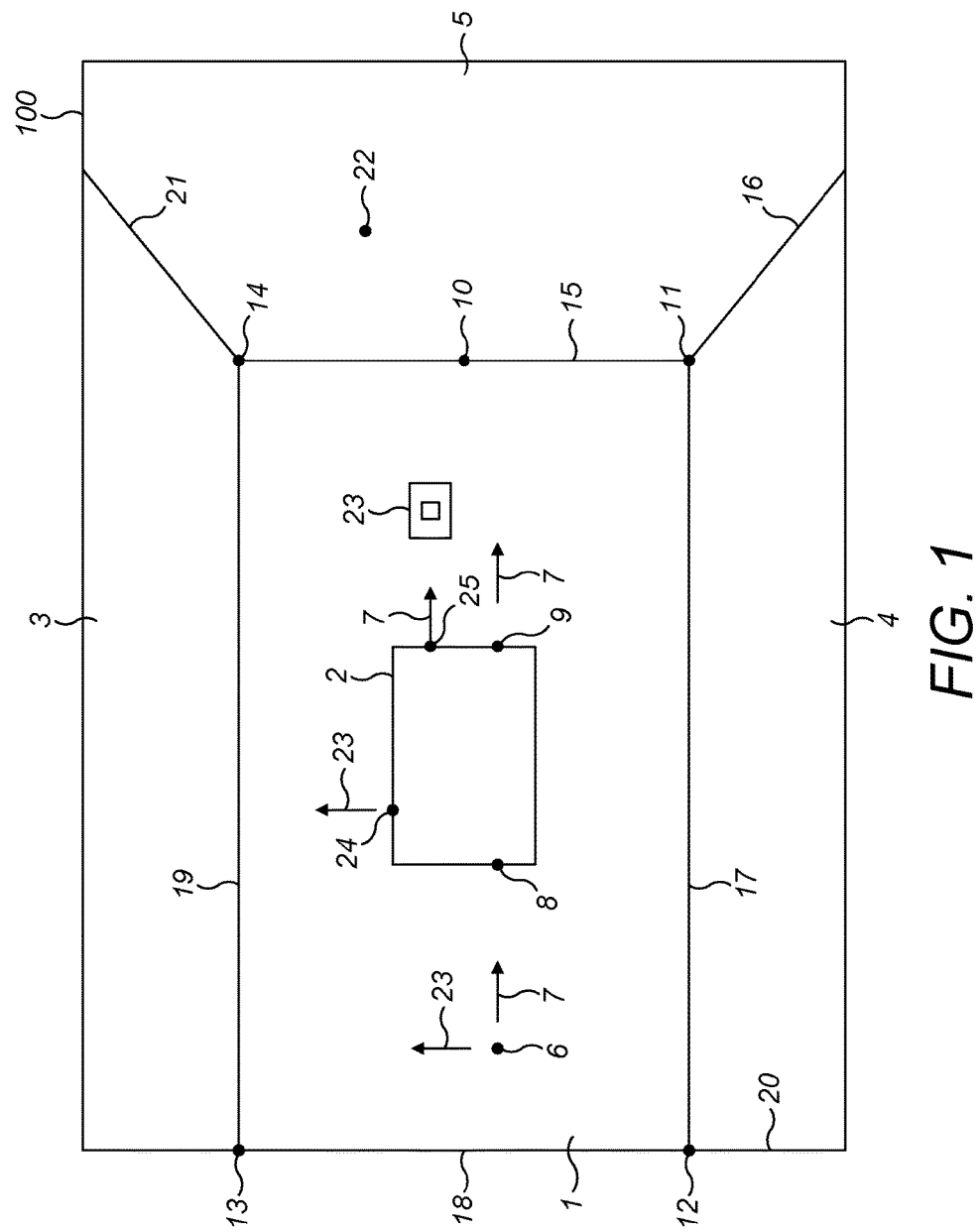
FIG. 1 illustrates the operation of a block detection algorithm on an image.

FIG. 1 shows an example image to illustrate the general principles of the object detection method described below. The image 100 contains colour block areas 1, 3, 4 and 5. The areas 1, 3, 4 and 5 are considered to be bounded by borders (which may include the edge of the image). It may be desired to detect those borders so that individual areas can be identified in the image. In this example, the image 100 is of a room and the areas 1, 2, 3, 4 and 5 are a first wall (1), a window (2), a ceiling (3), a floor (4) and a second wall (5) respectively.

A user can select an area to indicate that the area should undergo some further processing. For example, the user may wish to re-colour wall 1 in image 100. The user can select an arbitrary location 6 on wall 1 to indicate that the area of the image that corresponds to the wall 1 is the area that is to undergo the further processing. The selected location 6 can be used as an origin point from which a scanning process can begin to determine the perimeter of the wall 1. From the selected location 6, the image may be scanned in a scanning mode to find a border. The scanning mode may be in an initial scan direction as shown at 7 from a pixel at location 6. The scan may involve stepping to successive pixel positions in direction 7 and analysing each pixel position to determine whether any set of two adjacent ones are on opposite sides of a perimeter. The initial scan direction 7 is conveniently parallel to axes on which pixels of the image lie, but it need not be. The scanning mode involves stepping through the image from the selected location 6 in the initial scan direction 7. At each step the local region of the image is analysed using a border detection algorithm to assess whether it contains a border.

The step size may be a single pixel, so that the next step would be a pixel position adjacent to a current pixel position in the scanning direction. Depending on how the attribute of pixel positions from which one infers the presence of borders is calculated, it may provide a significant performance advantage to move one pixel at a time such that for any given pixel position, the same attribute of an adjacent pixel position has already been computed.

In the example in FIG. 1, the scanning in the scanning mode continues in the initial direction 7 until a border is detected at 8. The scanning may then change to a tracing mode. In the tracing mode, pixel positions around the border are analysed, to follow the path formed by the detected border.

Figure 2:
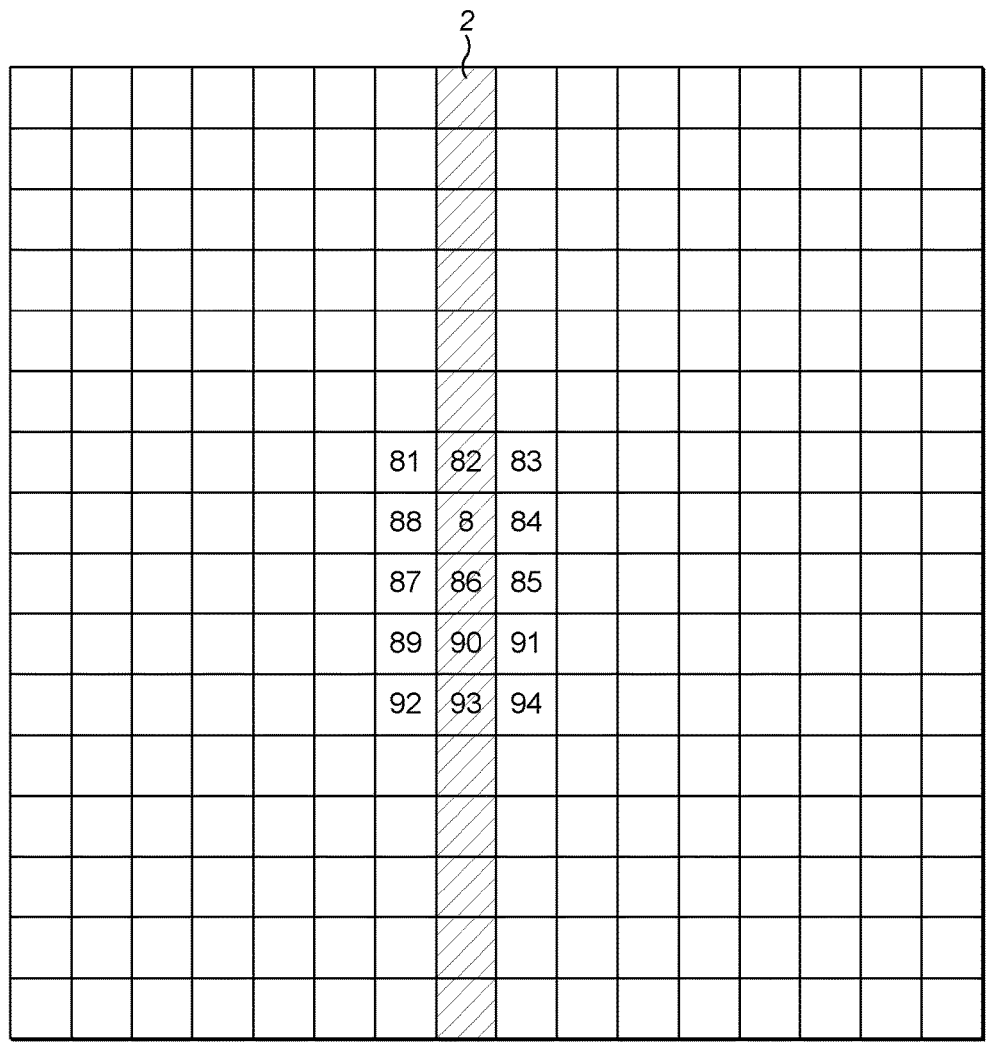
FIG. 2 shows pixels that represent a close-up of a region of the image of FIG. 1.

In the tracing mode, a border can be followed by performing a border detection algorithm on pixel positions that are adjacent to a set of pixel positions between which a border has been detected, to detect further sets of pixel positions of which the positions are on opposite sides of the border, and repeating the process. For example, FIG. 2 shows a close up around pixel positions 88 and 8, between which a border has been detected. Pixel positions 87-86 that are adjacent to pixel positions 88 and 8 are scanned for the presence of a border. A border is detected between pixel positions 87 and 86. The algorithm then steps to the next set of pixel positions so that the colour block area of the wall 1 is on a predetermined side with respect to the tracing direction. In this example, the predetermined side is the right side and so to keep the colour block area of the wall 1 on the right side, the tracing direction needs to be downwards.

Depending on how the attribute of pixel positions from which one infers the presence of borders is calculated, it may provide a significant performance advantage to move one pixel at a time such that for any given pixel position, the same attribute of an adjacent pixel position has already been computed. As an example, when computing this attribute for pixel positions 87 and 86, the attribute has already been computed for pixel positions 88 and 8 given the example above. As the border is followed in the tracing mode, the locations of points along the border can be stored for later use.

The scanning follows the border that is formed by the silhouette of the window 2, so as to map the series of locations in the image that make up that border, and so returns to location 8, where the border was first detected.

When the tracing returns to where it started, the block detection algorithm determines whether the followed boundary is the perimeter of the selected colour block area (wall 1) or not. The algorithm determines if the traced border is the perimeter of the wall 1 by:

1. determining if the selected location 6 is within that border; and
2. determining the direction in which the border is circumnavigated (i.e. clockwise or counterclockwise). If the predetermined side that the colour block area is to be kept at whilst tracing is the right side and the border is circumnavigated in the clockwise direction, then that border could be the perimeter of the colour block area if location 6 is within the perimeter. Otherwise, the border is not the perimeter of the colour block area. Also, if the predetermined side that the colour block area is to be kept at whilst tracing is the left side and the border is circumnavigated in the counter-clockwise direction, then that border is the perimeter of the colour block area if location 6 is within the perimeter. Otherwise, the border is not the perimeter of the colour block area.

In the example of FIGS. 1 and 2, location 6 is not within the border formed by the silhouette of the window 2 and the border is traced in the counter-clockwise direction whilst keeping the wall 1 on the right side. Thus, it is determined that the border is not that of wall 1.

If the tracing does not return to the location where the border was initially detected, then the algorithm determines that the followed border does not form a perimeter. The image can then be scanned elsewhere in the scanning mode.

When the block detection algorithm determines that a border is not the perimeter of the colour block area, the scanning returns to the scanning mode and resumes from a point which may be located on that border. In the example of FIG. 1, the scanning resumption point 9 would preferably be the other side of the window 2 from where the border was first met at 8 and the scanning in the scanning mode continues in the same direction 7.

When another border is met, e.g. at 10, the scanning switches from the scanning mode to the tracing mode. Similarly to the process described above for following the border of window 2, the tracing mode traces the border that is formed by wall 1 so that the wall 1 is kept to the right side. The tracing then returns to location 10, where this border was first detected. The block detection algorithm then determines if the followed border encloses the selected location 6 and determines the direction in which the border was circumnavigated. In this example, the selected location 6 is within the border formed by the wall 1 and the border was traced in the clockwise direction and thus the algorithm identifies this border as the perimeter of the wall 1.

The edge of the image may be considered to be a border. For example, when the scanning follows the border of wall 1 to position 12 which is at the end of the image, the algorithm can follow the edge as if it were a border. When the scanning reaches point 13, a border is detected and followed back to point 10.

As the perimeter of the wall 1 has been determined, the area within that perimeter may be further processed. For example, the user may wish to re-colour the wall 1. As another object (the window 2) has been detected within the perimeter of the wall 1, the area within the window perimeter may be omitted from the re-colouring so that only the area between the two perimeters (i.e. the wall 1) is re-coloured and not the area within a non-selected block (i.e. the window 2).

The user may select a second block in the image for further processing. For example, the user may select an arbitrary location 22 on second wall 5 and the block detection algorithm described above can be used to detect its perimeter. The results of previous border detection may be stored and used again to save on carrying out those calculations again. For example, certain attributes computed when following the left-hand side of border 15 in order to map the wall 1 may in some cases be reused when following the right-hand side of border 15 in order to map the wall 5. When the perimeter of the second wall 5 has been identified, further processing within the area of that perimeter can take place. This further processing may be carried out together with the further processing for wall 1. For example, the first wall 1 may be re-coloured to one selected colour and the second wall 5 may be re-coloured to another selected colour.

Preferably, each time an image is scanned for a border the scanning direction is the same. In the example of FIG. 1, when the scan is restarted from point 9, the scanning direction is preferably the same as the original scan direction from point 6. In this way, rather than selecting a random direction each time, the amount of pixel positions that are required to be scanned is likely to be reduced whilst ensuring that the border of the wall 1 will always be detected no matter how many other objects (like the window 2) are between point 6 and the border of the wall 1.

After the perimeter of the colour block area has been identified, it is desirable to scan the image in a series of directions inwards from the perimeter so as to detect further border crossings in the image, and then to scan the image in a series of directions outwards from said further borders so as to detect other borders inside the perimeter of the colour block area. Repeating the scan in this way allows further objects, like light switch 23, to be detected.

The algorithm can provide significant efficiency advantages. In order to perform border detection near a pixel position, information must be gathered about said pixel position, and its neighbouring pixel positions' attributes, such as their luminance. The gathering of that information may consume considerable processing power. Rather than performing border detection on a whole image, the block detection algorithm determines a relatively small number of pixel positions to perform border detection on in order to efficiently detect a selected object.

Figure 3:
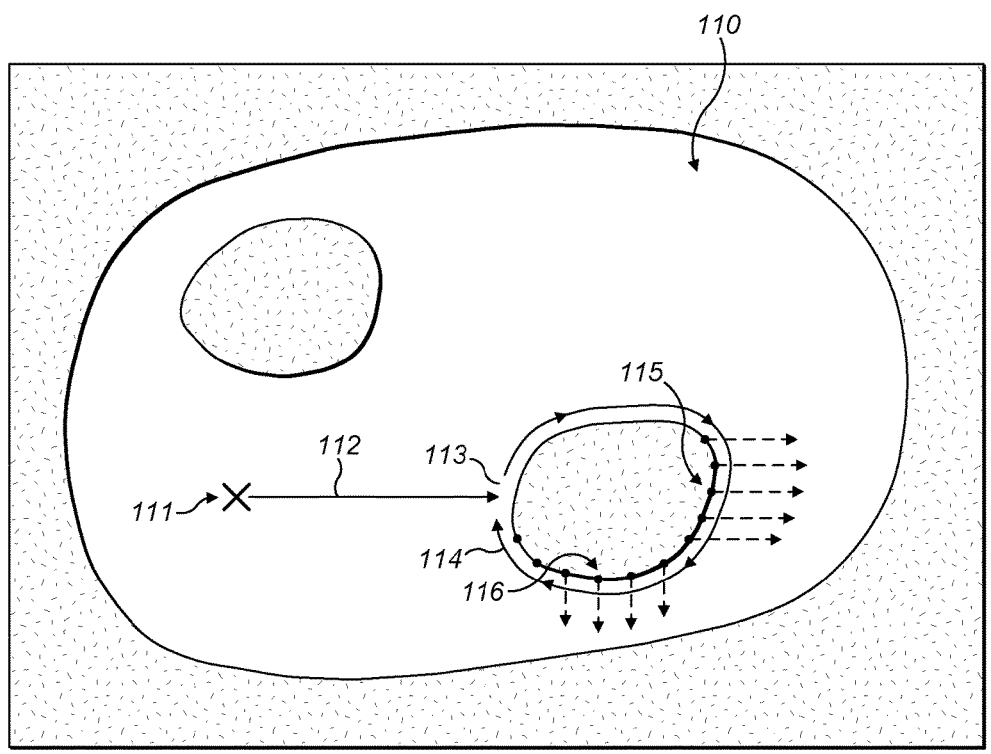
FIG. 3 shows another example of block detection.

FIG. 3 shows an image overlain with arrows indicating a series of scanning paths on the image. The image includes a colour block area 110 which is a contiguous region of the image that is determined to be a colour block area. The objective of the algorithm is to efficiently detect the borders of the block 110. Successive phases in the algorithm are illustrated at 111 to 114. The algorithm involves, in order:

a. selecting an arbitrary location 111 within the colour block area 110;

b. scanning in an arbitrary direction (as indicated at 112) from location 111 until a border of the block is detected (at 113);

c. circumnavigating that border, by successively a series of sets of two adjacent pixel positions on opposite sides of the border until the starting point 113 has been returned to, as shown at 114;

d. if that border is determined to be the perimeter of the colour block area 111, then scanning downwards and rightwards starting from points on that border whose locations mean the scanning will be directed within that border, or if that border is determined not to be perimeter of the colour block area 111 then scanning downwards and rightwards starting from points on that border that mean the scanning will be directed outside that border.

Steps c and d are repeated until the block has been comprehensively characterised.

In more detail, this algorithm is as follows.

First, a point is designated within the colour block area whose borders are to be found. That is point 111 in FIG. 3. The point should be at a location that forms part of the area.

The algorithm may be pre-programmed with a pre-defined definition of the nature of the block. For example, it may be known in advance that the block to be detected will have a certain chrominance. Alternatively, the nature of the image at or in the region around the designated point may be taken to characterise the nature of the block. For example, the chrominance of the designated point may be sampled, or an average may be taken of the chrominance of pixels within a predefined radius around the designated point. The definition of the nature of the colour block area is used to help establish the borders of the block, as will be described below.

The image is then scanned in a direction away from the designated starting point. This is illustrated at 112 in FIG. 3. The image is preferably scanned in a straight line. In the present example this scan is performed in a rightwards direction, but it could proceed in any direction. At each step in the scan the image is assessed to determine whether it matches the nature of the colour block area, as previously determined, or not. For example, if the block is defined by chrominance, an assessment can be made of whether the chrominance of the current scan location is within a predefined threshold of the chrominance that characterises the block. If the current scan location does match the block, and the current scan location is not at the edge of the image, then the scan continues.

If the current scan location does not match the block, or is at the edge of the image, then it represents a point on a border of the block. This is illustrated at 113 in FIG. 3. The algorithm now maps that border. Conveniently it does that by tracing around the border in a stepwise fashion. It does that by tracing so as to keep the colour block area at the predetermined side, as described above and thus traces in a clockwise or anticlockwise path around the border according to the predetermined side. In this example, the predetermined side is the left side and thus the non-matching object is traced in the clockwise direction. Any suitable border tracing algorithm can be used for tracing. For example, the chrominance of the eight pixels surrounding the current tracing location could be considered, a next point along the border could be identified, the border trace could step to that point, and the same process could then be repeated. When the border tracing meets an edge of the image, the edge is followed until another border between the block and the region outside the block is met, and then the algorithm follows that border around or into the block. This process is carried out until the border has been traced in a loop, so the tracing has returned to the starting point 113, as illustrated at 114.

Next a determination is made of whether the newly traced border surrounds the starting point and of the direction that the border is traced. If the newly traced border surrounds the starting point and is traced in the anticlockwise direction (if the predetermined side is left) then it represents the outer border of the colour block area. In that case, scanning directed from the newly traced border will be directed into the region surrounded by the newly traced border. If the newly traced border does not surround the starting point and is traced in the clockwise direction (if the predetermined side is left) then it represents an inner border of the colour block area. In that case, scanning directed from the newly traced border will be directed into the region outside the newly traced border.

Scanning then takes place in two non-parallel directions from a series of locations on the newly detected border. Conveniently those directions are orthogonal. Conveniently the directions are parallel with pixel axes of the image. In this example the directions will be taken to be rightwards and downwards, but other directions may be selected and in that case the starting points for scanning can be varied accordingly.

For the example of the border at 114, which is an internal border, scanning from that border will be directed externally of that border. A set of border locations shown by dots at 115, 116 are selected from which scanning can take place in the desired directions outside and starting from the border. The selected border locations can be spaced apart in order to speed up the processing. The spacing between the border locations can be selected in dependence on the precision with which it is desired to characterise the block but it could, for example, be 32 pixels in a direction orthogonal to the direction from which scanning from the respective border locations is to take place. Thus, for rightwards scanning border locations 115 are selected. These are a set of locations that span the whole of the extent of the newly detected border that faces rightward out of the block (i.e. towards outside the region surrounded by the border) and are spaced apart by the predetermined spacing. Rightwards scanning outside the block will take place starting from these locations. For downwards scanning border locations 116 are selected. These are a set of locations that span the whole of the extent of the newly detected border that faces downwards out of the block and are spaced apart by the predetermined spacing. Downwards scanning outside the block will take place starting from these locations.

In the next step scanning takes place from each of the border locations in the respective direction. Each such scan takes place until another border is met. The presence of a border can be detected in the way described above. Scanning could take place from each border location in turn, or progressively from multiple ones of the border locations.

When such a scan meets a border (including the edge of the image) the process described above is continued. That is:

1. the newly found border is circumnavigated;

2. it is determined whether the newly found border is that of the colour block area, in which case scanning starting from border locations on that border will be directed into that area, and otherwise scanning starting from border locations on that border will be directed out of that border;

3. a set of border locations on the newly found border are determined that span the extent of the newly found border that face into or out of (in accordance with the determination made in the preceding step) the newly found border in the two predetermined scan directions;

4. scanning takes place from each of those locations in the respective scanning direction.

In this way the whole block can be efficiently characterised. To permit the algorithm to terminate efficiently it can make a check in step 1 as to whether the newly found border point is on or substantially on (e.g. within a predetermined threshold distance of) a border that has already been found.

Figure 4A:
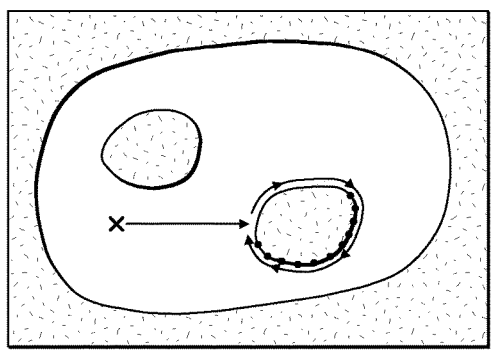
FIG. 4 shows steps in a block detection method.
Figure 4B:
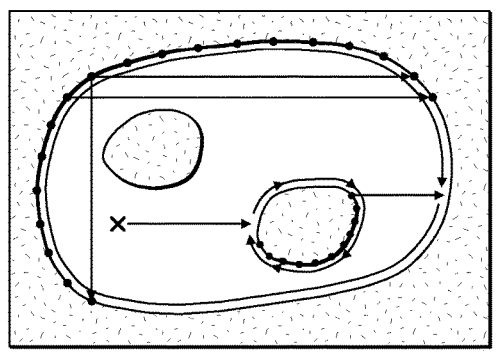
Figure 4C:
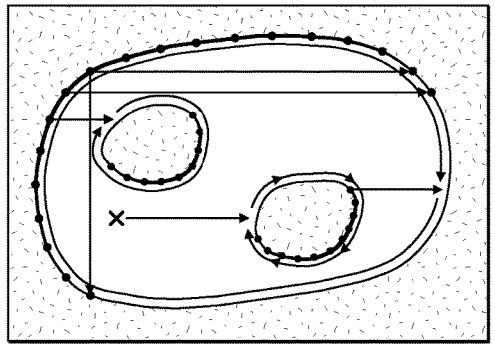
Figure 4D:
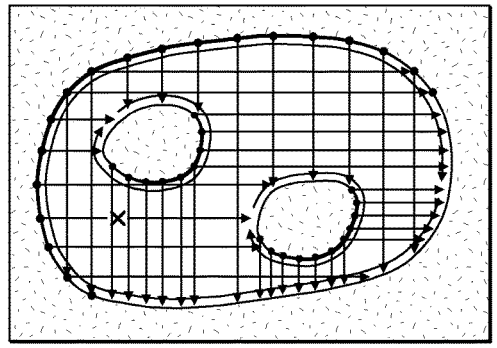

FIG. 4 illustrates a series of steps in processing the image of FIG. 3. They are:

FIG. 4*a*: scan rightwards from starting location, detect border, determine that border has not been located before, circumnavigate that border, determine it does not contain the starting point (so scanning from that border will be directed outside of it), determine suitable new border locations on that border from which outwards scanning can be directed;

FIG. 4*b*: scanning outwards from the previously detected border, detect another border, determine that border has not been located before, circumnavigate that border, determine it does contain the starting point (so scanning from that border will be directed inside of it), determine suitable new border locations on that border from which inwards scanning can be directed, perform inwards scanning, detect borders, determine they have been located before and so do not circumnavigate them again;

FIG. 4*c*: continue scanning from the last circumnavigated border, detect another border, determine that border has not been located before, circumnavigate that border, determine it does not contain the starting point (so scanning from that border will be directed outside of it), determine suitable new border locations on that border from which outwards scanning can be directed;

FIG. 4*d*: continue scanning from previously circumnavigated borders until the image has been adequately characterised.

As each border is mapped the points along its length are stored. This allows it to be determined later on whether a border has already been found, and once the algorithm has completed provides a record of the borders in and around the block.

Once the borders have been located any suitable processing can then be undertaken.

In a first example, the image can be modified so as to highlight the locations of the detected borders, e.g. in an eye-catching colour. Then the resulting image can be displayed. This may be useful in a vehicle for highlighting the borders of a road viewed through a camera mounted on the vehicle.

In a second example, the regions of the image that correspond to the colour block area can be transformed, and the resulting image can be displayed. The transformation is applied to the region within the outer border of the area but outside any inner borders of the area. The transformation may, for example, be to lighten or darken that region, to apply a screen (e.g. cross-hatching) to that region, or to change the chrominance of that region. If the region is lightened or darkened then the chrominance at each point in the region may remain unchanged. This can give the impression of shining a light on, or shading, the region. If the chrominance of the region is changed then the brightness at each point in the region may remain unchanged. This can give the impression of re-colouring the region. This is useful, for instance, for simulating painting the region in a certain colour.

The methods described herein may be applied to a still image or to a frame of a video stream. In the case of a video stream, it may be inconvenient to manually select a starting point in each frame of the image. A starting point may be selected automatically by, for example, estimating the rotation by which a later frame of the video frame has been shifted from a previous frame and choosing a starting point for the processing of the subsequent frame that is offset by that rotation from either the starting point used in the previous frame or from a geometrically central point of the block identified in the previous frame. Other algorithms could be used for a similar purpose.

Using the methods described herein each frame of the video can be processed, transformed and displayed in real time.

The initial starting point could be determined automatically, by a mechanism appropriate to the type of block that is to be found, or manually by a user designating a point on the image. In one convenient example, the image can be displayed on a touch screen and the user can designate the starting point by touching a point in the image. This provides an intuitive way for the user to identify the block of concern, because the user simply needs to touch the block.

To simplify the border detection and storage, and the subsequent transformation of an image, the system may ignore borders that are below a pre-defined minimum size. That size may be defined as a minimum border length or a minimum linear dimension. If a border once circumnavigated proves to be below the pre-defined minimum size then it may be ignored.

When the process is scanning, as initially from the starting point and as described at step 4 above it may take place in one-pixel increments. Alternatively, it may take place in larger increments.

The examples described above used simple pixel attributes such as luminance and chrominance to characterise blocks and their borders. More complicated metrics could be used. The attribute that is used in the processing described above can be selected dependent on the characteristics it is desired to analyse. In some examples, the attribute could be dependent solely on the values of an individual pixel under consideration: as for example with the case of luminance or chrominance. For instance, if borders are being sought between light and dark parts of the image then the attribute could be a luminance value of the pixel. If borders are being sought between regions on the basis of their blueness then the attribute could be the blue intensity value of each pixel. The relevant attribute for each scanned pixel can be assessed against a predetermined threshold. For example, if the attribute is brightness then the threshold might be 50% of the available brightness scale. If the attribute of a pixel position is above the threshold and the attribute of an adjacent pixel position is below the threshold, then a border can be considered to be detected between those pixel positions. The algorithm may be variable so as to allow the relative influence of pixels distant from the pixel in question to be increased or decreased. The attribute may be determined by summing intermediate values calculated for a set of pixels neighbouring the pixels in question.

The extent of those neighbouring values may be varied, e.g. in dependence on the level of detail, focus or range at which the image is being considered. Each intermediate value may be weighted by a weighting factor determined according to a weighting algorithm. In one preferred example the attribute of each pixel is determined by means of the Laplacian of Gaussian, in which the position of an edge is determined from detecting the zero-crossing of the Laplacian operator applied to a Gaussian-smoothed image. The Laplacian of Gaussian can be calculated by determining a weighted sum of the intensities of pixels neighbouring the pixel in question, the weights being determined according to the Laplacian of Gaussian filter centred on the pixel in question. With the pixel position in question being x=0, y=0, the Laplacian of Gaussian filter gives a weighting for a pixel at x, y of:

$$-\frac{1}{\pi\sigma^4}\left(1-\frac{x^2+y^2}{2\sigma^2}\right)e^{-\frac{x^2+y^2}{2\sigma^2}}$$

Where σ represents the Gaussian standard deviation, influencing the weighting of the function with radius from the pixel in question. The weightings may be calculated in advance and stored in a look-up table for use when the attribute of a given pixel is to be computed. Weightings for a range of values of σ may be pre-computed and stored and applied as appropriate when the image is to be analysed at an appropriate level of detail. The weightings may be approximated for convenience. When estimating the attribute of a particular pixel the weightings may conveniently be applied only to the pixels of a square block (i.e. a block whose sides are of equal pixel length) centred on that pixel, and thus not to pixels outside that block. This can simplify the computation.

Other filters with similar properties, including but not limited to difference-of-Gaussians, determinant of Hessian, Sobel, Canny and Canny-Deriche could be used either alone or in combination with other functions to determine the attribute of a pixel.

Figure 5:
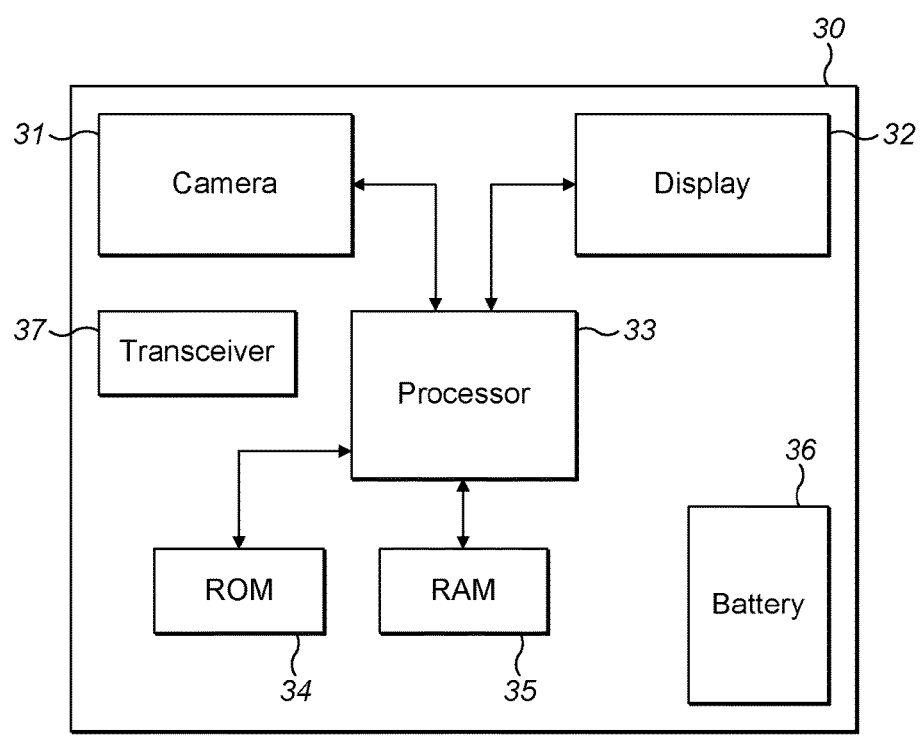
FIG. 5 shows a device suitable for image processing.

FIG. 5 illustrates apparatus for implementing the methods described above. The device comprises a housing 30 in which are a camera 31, a display 32, a processor 33, a non-volatile memory or ROM 34 and a working memory or RAM 35. The apparatus is powered by a battery 36. In this example the display 32 is a touchscreen, so it provides user input to the processor 33 as well as being driven by the processor, but a separate keypad could be provided. The ROM 34 stores program code that is executable by the processor. The program code is stored in a non-transient form. The program code is executable by the processor to perform the functions described above. In operation the processor 33 can receive an image, either from the camera 31 or from a remote communications transceiver 37 or from a data store such as flash memory. In the case of a camera 31, the image could be an image captured by the camera 31 of the environment at the location of the device. In the case of the transceiver 37, the image could be downloaded from the internet. The processor stores the image in RAM 35. The image could be displayed on the display 32. A user may select a position on the displayed image (e.g. via the touch screen or a mouse). Once the image is stored in RAM 35, the processor 33 can analyse it using the algorithms as described above. Then, dependent on the outcome of the analysis the process may perform further operations in dependence on the stored program code. For example, it could alter the image to highlight detected borders. Alternatively it could re-colour selected regions inside one or more detected borders. Alternatively, a user could select one of those regions, and the processor could identify other regions that are surrounded by detected borders and have attributes in common with the selected region (for example a chrominance that differs by less than a predetermined threshold from the average chrominance of the selected region) and then recolour both the selected and the identified regions similarly.

In the example above, the device can capture image data and process it locally. Alternatively, it could capture image data, transmit it to a remote server for analysis and then receive back from the server information related to the detected borders.

The device of FIG. 5 could be a smartphone.

The image could be a still image or a frame or portion of a frame of a video stream.

Each pixel is a sub-unit of the image. The pixels could be monochrome or colour pixels. For display or image capture a colour image is often divided into channels of individual colours which when considered collectively represent a certain luminance and chrominance at a certain location. For the purpose of performing the algorithm described above a single pixel of the image may be considered to be formed by those channels in combination. Preferably for the purpose of performing the algorithm described above each pixel fully characterises the visual content of the image at the location of the pixel.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A computer-implemented method for identifying and processing a colour block area in an image, the method comprising:
    a) scanning for border crossings in the image in a direction from a user-provided origin point within the colour block area;
    b) on finding a border crossing, tracing a path of the border such that the colour block area is on a predetermined side of the traced path;
    c) if the path encloses the origin point and is traced clockwise or counterclockwise according to the predetermined choice of keeping the colour block area to the right or left respectively, determining that the border is a perimeter for the colour block area; or if not, continuing to scan for border crossings in said direction;
    d) if the border is determined to be the perimeter of the colour block area, scanning from the perimeter the image in the colour block area so as to detect further border crossings in the image; and
    e) processing, based on the determined perimeter, the colour block area.

2. A method as claimed in claim 1, wherein scanning the image in the colour block area comprises scanning in a series of directions inwards from the perimeter.

3. A method as claimed in claim 2, wherein the series of directions comprise a first set of mutually parallel directions and a second set of mutually parallel directions orthogonal to the first set of mutually parallel directions.

4. A method as claimed in claim 2, wherein in each step of scanning the image in a series of directions the available directions are the same.

5. A method as claimed in claim 1, wherein the method comprises, on detecting each further border crossing in the image:
tracing a further border defined by that further crossing;
determining that the traced further border is within the perimeter for the colour block area and encloses a further area; and
scanning the image in a series of directions outwards from said further border so as to detect other border crossings in the image.

6. A method as claimed in claim 5, comprising determining a region of the image (i) having as its perimeter the perimeter of the colour block area and (ii) excluding the further area defined by the further border.

7. A method as claimed in claim 6, comprising:
processing the image to apply a transformation to the determined region, the remainder of the image remaining substantially unchanged under the transformation; and
displaying an image resulting from the transformation.

8. A method as claimed in claim 7, wherein the transformation is a change of chrominance and/or luminance.

9. A method as claimed in claim 1, wherein the method comprises, on detecting the perimeter of a colour block area containing the origin point:
determining whether said perimeter exceeds a predetermined threshold and/or the size of the area exceeds a predetermined threshold and/or the circumference of said perimeter that encloses the area exceeds a predetermined threshold; if not, discarding the detected perimeter and continuing to scan in the same direction.

10. A method as claimed in claim 1, comprising:
displaying the image via a device; and
obtaining user input via said device indicating the origin point.

11. A method as claimed in claim 1, wherein the image is a frame of a video stream.

12. A device comprising:
a memory storing non-transient program code; and
a processor configured to identify and process a colour block area, given an image and a user-provided origin point by executing the code to perform the steps of:
a) scanning for border crossings in the image in a direction from a user-provided origin point within the colour block area;
b) on finding a border crossing, tracing a path of the border such that the colour block area is on a predetermined side of the traced path;
c) if the path encloses the origin point and is traced clockwise or counterclockwise according to the predetermined choice of keeping the colour block area to the right or left respectively, determining that the border is a perimeter for the colour block area; or if not, continuing to scan for border crossings in said direction;
d) if the border is determined to be the perimeter of the colour block area, scanning from the perimeter the image in the colour block area so as to detect further border crossings in the image; and
e) processing, based on the determined perimeter, the colour block area.

13. A device as claimed in claim 12, wherein the processor is further configured to scan the image in the colour block area by scanning in a series of directions inwards from the perimeter.

14. A device as claimed in claim 13, wherein the series of directions comprise a first set of mutually parallel directions and a second set of mutually parallel directions orthogonal to the first set of mutually parallel directions.

15. A device as claimed in claim 12, wherein the device comprises a display and the device is configured to:
determine a region of the image (i) having as its perimeter the perimeter of the colour block area and (ii) excluding an area defined by the further border that is within the perimeter of the colour block area;
process the image to apply a transformation to the determined region, the remainder of the image remaining substantially unchanged under the transformation; and
display the image resulting from the transformation on the display.

16. A device as claimed in claim 12, wherein the device comprises a camera and the image is an image captured by the camera.

17. A device as claimed in claim 16, wherein the image is a frame of a video stream captured by the camera.

18. A device as claimed in claim 17, wherein the device is configured to perform the said steps in real time on successive frames of the video stream.

19. A device as claimed in claim 12, wherein processor is further configured to, on detecting each further border crossing in the image:
trace a further border defined by that further crossing;
determine that the traced further border is within the perimeter for the colour block area and encloses a further area; and
scan the image in a series of directions outwards from said further border so as to detect other border crossings in the image.

20. A non-transitory computer readable storage medium having stored thereon computer readable instructions that, when executed at a computer system, cause the computer system to perform a method for identifying and processing a colour block area in an image, the method comprising:
a) scanning for border crossings in the image in a direction from a user-provided origin point within the colour block area;
b) on finding a border crossing, tracing a path of the border such that the colour block area is on a predetermined side of the traced path;
c) if the path encloses the origin point and is traced clockwise or counterclockwise according to the predetermined choice of keeping the colour block area to the right or left respectively, determining that the border is a perimeter for the colour block area; or if not, continuing to scan for border crossings in said direction;
d) if the border is determined to be the perimeter of the colour block area, scanning from the perimeter the image in the colour block area so as to detect further border crossings in the image; and
e) processing, based on the determined perimeter, the colour block area.

* * * * *